United States Patent Office 2,694,023
Patented Nov. 9, 1954

2,694,023

METAL TREATING FLUX

Robert K. Hopkins, Staten Island, N. Y., assignor to The M. W. Kellogg Company, Jersey City, N. J., a corporation of Delaware No Drawing. Application April 8, 1950,
Serial No. 154,895

1 Claim. (Cl. 148—26)

The present invention relates to the art of heating metals and more particularly to a flux and to a method of generating heat by the current discharge action of a flux submerged electrode to promote fusion of metal and/or to maintain a body of metal in molten condition.

After molten metal, especially of the ferrous alloy type, has been deposited in a mold, it is desirable to hot-top the deposited metal to control its solidification and/or to maintain the top portion thereof fluid until the last, and in condition to feed the shrinkage cavity below. For that purpose, electric current is discharged through a gap, or gaps, between the end, or ends, of one or more non-consumable electrodes and the surface of the molten metal in the mold while the end of the electrode, or electrodes, the surface of the molten metal and the gap, or gaps, are maintained beneath the surface of a body of flux. The electric current discharged across the gap, or gaps, effects the necessary heating of the metal.

I have found that lime-silica systems, lime-silica-spar systems, lime-silica-alumina systems, and the like, are not entirely satisfactory for use as a flux in the electric hot-top method described.

I have furthermore found that lime has a highly oxidizing effect on the metal treated at the extremely high temperatures developed in the electrical heating method described when it is used as a component of the flux in the amounts commonly used in the fluxes employed in the steel industry. In almost every case when lime was used in amounts greater than 20%, oxidation of desirable components of the metal treated such as chromium, carbon, and the like, took place. This oxidation was accompanied by reduction of flux components so that the ultimate effect was a reduction in content of desirable components of the metal treated coupled with an addition of undesirable, or unwanted, components. It has also been discovered that while a high percentage of lime results in a flux capable of developing high surface temperatures, the heat distribution is not satisfactory as the heat is not directed downwardly into the metal bath to the extent necessary to provide high temperature levels sufficiently beneath the surface of the metal to enable the metal heating operation to be carried on efficiently.

One object of the present invention is to provide a new and improved flux which is adapted for use in the flux submerged electrode method of generating heat and especially in connection with hot-top operations, which has good electrical qualities for the metal heating process described, which is capable of promoting such a distribution of the heat generated that heat is propagated at high temperature levels down into the metal below said flux, and which is liquid and of such low viscosity at the operating temperatures that it readily flows to cover the whole surface of the metal and because of its heat conductivity distributes the heat to the whole surface of the metal beneath.

Another object of the invention is to provide a new and improved method of fusing and/or hot-topping metal by the current discharge action of an electrode submerged in a flux affording the maximum of desirable metal fusing and hot-topping conditions.

I have found in accordance with the present invention that flux systems having a high percentage of alumina do not promote oxidation of components of the metal treated and the accompanying reduction of flux components; furthermore, high percentage alumina fluxes provide superior heat distribution and result in the propagation of heat at high temperature levels well into the metal treated.

The novel flux of the present invention contains alumina as a major constituent. Alumina by itself does not make a satisfactory flux for the electrical heating method, above referred to, as it is too refractory and does not possess the proper characteristics. However, it was found that by the addition thereto of flux components which under the high temperature conditions of said electrical heating method interfuse with the alumina, probably to produce complex alumina systems, a primary flux system is produced which has all of the required properties and characteristics to a marked degree. It was found that by the controlled additions of silica and fluorspar to controlled amounts of alumina a satisfactory primary flux system is produced which can be used as the whole flux or to which other components may be added to produce the whole flux.

The silica lowers the melting point and reduces the viscosity of the primary flux system while the fluorspar gives to said system the desired electrical conductivity. Both the silica and the fluorspar must be employed. If it is attempted to eliminate the fluorspar the electrical resistivity will be too high. If it is attempted to eliminate the silica the electrical conductivity will be too high.

The novel flux of the invention containing the components of said primary flux system in the following percentage ranges:

| | Percent |
|---|---|
| $Al_2O_3$ | 30–65 |
| $CaF_2$ | 10–20 |
| $SiO_2$ | 5–25 | is fully satisfactory under the conditions of said electrical heating method. The fluxes containing the components of said primary flux system within the analysis range, above stated, have good electrical conductivity and readily support the electrical discharge, they are liquid and of sufficiently low viscosity to flow readily to cover the whole surface of the metal treated, their heat conductivity is good so that heat is conducted at high rates to the very edges of the flux menstruum, they promote a satisfactory heat distribution as when they are used the heat generated is propagated at high temperature levels well beneath the surface of the metal treated so that said generated heat is efficiently used, and they do not promote oxidation of components of the metal treated nor are components of the flux reduced and added to the metal.

It has been found that in some cases the novel flux, can be improved and some of its desirable properties and characteristics accentuated by the addition to said primary flux system of minor components in controlled amounts such as calcium oxide and magnesium oxide. CaO when added in amounts up to 15% improves the heat distribution obtained but if 15% is exceeded the whole character of the flux deteriorates and if the excess is material the flux becomes unsatisfactory. MgO when added in amounts up to 20% results in more heat finding its way to the metal treated and appears to increase the conductivity to a limited extent. Again if materially more than 20% of MgO is added the properties of the flux become unsatisfactory. Either or both CaO and MgO may be added and neither of these flux components when used within the limits stated, whether only one or both are used, appear to promote the objectionable oxidation and reduction above referred to.

The novel flux, as made up of its primary flux system components and said secondary components, is constituted essentially as follows:

| | Percent |
|---|---|
| $Al_2O_3$ | 30–65 |
| $CaF_2$ | 10–20 |
| $SiO_2$ | 5–25 |
| CaO | 0–15 |
| MgO | 0–20 |

The following example illustrates a specific flux embodying the principles of the present invention, but it is not to be construed as limiting the invention:

| | Percent |
|---|---|
| $Al_2O_3$ | 50 |
| $CaF_2$ | 15 |

| | Percent |
|---|---|
| $SiO_2$ | 10 |
| CaO | 15 |
| MgO | 10 |

The above specific flux has all of the desirable properties and characteristics enumerated and explained above in connection with broad disclosure of the novel flux of this invention and in addition it is characterized by a superior heat distribution and heat penetration downward into the metal treated. The electrical characteristics of this specific flux are excellent, i. e., this flux is easily capable of steadily supporting an electrical discharge within the voltage and amperage range usually employed in the metal producing process and in the metal heating process above referred to. Furthermore, this specific flux does not promote the oxidation of components of the metal treated nor are any of its components reduced and added to the metal beneath it in the metal producing process or in metal heating process above referred to.

In carrying out the hot-topping method of the present invention, the steps are substantially those described in Patent No. 2,370,467, except for the flux employed. In this method, as applied to the production of cast bodies, especially those having iron as the base ingredient, the cast metal is produced in any manner and deposited in molten condition in a mold, until the desired level therein has been reached. The deposited metal is covered with a layer of flux having the composition described above while one, or more, non-consumable electrodes is lowered into the mold and its discharge end submerged in the flux. An electrical discharge is then initiated between said tip and the surface of the deposited metal in any convenient way. The electrode and the metal are electrically connected in the same circuit to effect this electrical discharge.

The flux may be molten or in the solid-dry condition when it is placed in the mold. When solid-dry flux is used an arc starter is employed to initiate the current discharge. In any event the heat produced by the discharge of current in the initial phases of the process causes the formation of a highly heated pool of flux around the electrode capable of supporting the desired length gap for normal running. The whole of the flux soon attains the highly heated condition so that highly heated flux extends to the walls of the mold and completely covers the deposited metal as well as submerges the tip of the electrode and the discharge gap. The heat generated by the electric current discharge is distributed through the molten highly heated flux over the whole surface of the deposited metal and is propagated downwardly into said metal to maintain the upper portion thereof fluid and in condition to feed the shrinkage cavity below and thus effect hot-topping. The flux, during this operation, not only distributes the heat generated effectively and by promoting its downward propagation makes possible the efficient use thereof but also protects the deposited metal against atmospheric contamination and insulates it against rapid heat loss.

While the invention has been described with particular reference to a specific embodiment, it is to be understood that it is not to be limited thereto, but is to be construed broadly and restricted solely by the scope of the appended claim.

I claim:

A flux consisting of about 50% alumina, about 15% fluorspar, about 10% silica, about 15% lime, and about 10% magnesia.

References Cited in the file of this patent

UNITED STATES PATENTS

| Number | Name | Date |
|---|---|---|
| 977,406 | Jewett | Nov. 29, 1910 |
| 1,097,926 | Koper | May 26, 1914 |
| 2,290,961 | Heuer | July 28, 1942 |
| 2,370,467 | Hopkins | Feb. 27, 1945 |
| 2,435,852 | Stringham | Feb. 10, 1948 |
| 2,510,154 | Tanczyn | June 6, 1950 |
| 2,510,155 | Tanczyn | June 6, 1950 |
| 2,585,568 | Marshall et al. | Feb. 12, 1952 |